US012037234B2

(12) United States Patent
Griffioen et al.

(10) Patent No.: US 12,037,234 B2
(45) Date of Patent: Jul. 16, 2024

(54) PRESSURE VESSEL FOR USE IN A BEVERAGE DISPENSING ASSEMBLY

(71) Applicant: Heineken Supply Chain B.V., Amsterdam (NL)

(72) Inventors: Edwin Johannes Cornelis Griffioen, Amsterdam (NL); Robert Hugo Sluijter, Amsterdam (NL); Arie Maarten Paauwe, Amsterdam (NL)

(73) Assignee: HEINEKEN SUPPLY CHAIN B.V., Amsterdam (NL)

( * ) Notice: Subject to any disclaimer, the term of this patent is extended or adjusted under 35 U.S.C. 154(b) by 0 days.

(21) Appl. No.: 17/907,946

(22) PCT Filed: Mar. 1, 2021

(86) PCT No.: PCT/NL2021/050134

§ 371 (c)(1),
(2) Date: Aug. 30, 2022

(87) PCT Pub. No.: WO2021/172995

PCT Pub. Date: Sep. 2, 2021

(65) Prior Publication Data

US 2023/0096834 A1 Mar. 30, 2023

(30) Foreign Application Priority Data

Feb. 28, 2020 (NL) ...................................... 2025019

(51) Int. Cl.
*B67D 1/04* (2006.01)
*B67D 1/08* (2006.01)

(52) U.S. Cl.
CPC ......... *B67D 1/0462* (2013.01); *B67D 1/0801* (2013.01); *B67D 2001/0822* (2013.01); *B67D 2210/00049* (2013.01)

(58) Field of Classification Search
CPC ................ B67D 1/0462; B67D 1/0801; B67D 2001/0822; B67D 2210/00049; B67D 2210/00062; B67D 1/0804
See application file for complete search history.

(56) References Cited

U.S. PATENT DOCUMENTS 6,820,763 B2 11/2004 Bilskie et al.
6,926,170 B2 8/2005 Groesbeck
(Continued)

FOREIGN PATENT DOCUMENTS

EP 2154103 A1 2/2010
EP 2163509 A1 3/2010
(Continued)

OTHER PUBLICATIONS

International search Report isssued in corresponding PCT application No. PCT/NL2021/050134, dated Aug. 12, 2021, 7 pages.

*Primary Examiner* — Donnell A Long
(74) *Attorney, Agent, or Firm* — Tucker Ellis LLP

(57) ABSTRACT

A pressure vessel assembly is provided for use in a beverage dispensing assembly. The assembly comprises a pressure vessel comprising a housing provided by at least two shell parts, the housing comprising, a gas inlet for receiving a gas in the pressure vessel and a beverage dispensing passage, wherein the at least two shell parts are releasably connectable for forming the housing and for receiving a compressible beverage container assembly filled with a substantially non-carbonated beverage in the housing. The assembly further comprises a compressible beverage container assembly, comprising a flexible bag defining a beverage storage volume, a filling gland, connected to the flexible bag providing a gland beverage passage to the beverage storage volume, and female adapter part, connectable to the filling gland, arranged to receive at least part of a male adapter part
(Continued)

of a dispensing line, wherein a sealing member is provided in the gland beverage passage.

19 Claims, 10 Drawing Sheets

(56) References Cited

U.S. PATENT DOCUMENTS

| | | | | |
|---|---|---|---|---|
| 2009/0145924 | A1 | 6/2009 | Fiedler | |
| 2010/0096040 | A1 | 4/2010 | Litto | |
| 2011/0186600 | A1 * | 8/2011 | Rasmussen | B67D 1/07 222/148 |
| 2018/0297830 | A1 * | 10/2018 | Kraenzle | B67D 1/0807 |
| 2020/0055723 | A1 | 2/2020 | Johnson | |

FOREIGN PATENT DOCUMENTS

| | | | |
|---|---|---|---|
| NL | 2017109 | B1 | 1/2018 |
| WO | 9009951 | A1 | 9/1990 |
| WO | 03050031 | A1 | 6/2003 |
| WO | 2018162351 | A1 | 9/2018 |

* cited by examiner

200

PRESSURE VESSEL FOR USE IN A BEVERAGE DISPENSING ASSEMBLY

TECHNICAL FIELD

The aspects and embodiments thereof relate to a pressure vessel for use in a beverage dispensing assembly.

BACKGROUND

NL2017109 discloses a beverage dispensing assembly and a beverage container for use in a beverage dispensing assembly. The beverage container has a neck portion and a shoulder portion adjacent the neck portion, wherein the neck portion is provided with at least a beverage outflow opening and at least one gas inlet opening.

The beverage container disclosed in NL2017109 can be a Bag-In-Container (BIC) type container, comprising an outer container and an inner container. This BIC type container can be blow moulded from an integral preform or a preform assembly made of plastic.

For dispensing a beverage from the dispensing assembly of NL2017109, a pressurised gas is supplied to a space between the outer container and the inner container. By virtue of the pressurised gas, the inner container may be compressed and beverage may be dispensed out of the outflow opening.

SUMMARY

The beverage dispensing assembly of NL2017109 is used for dispensing carbonated beverages, such as beer. When filling containers for use in a dispensing system of NL2017109 with a different beverage than beer, for example with a non-carbonated beverages, such as coffee, tea, wine and fruit juices, the filling process may need to be aseptic, to prevent spoilage of these beverage, especially when the container is stored without being cooled.

Aseptic filling may be defined as a filling process wherein the container that is being filled as well as the beverage with which the container is filled is substantially sterilised to remove, kill, or deactivate microorganisms present in and/or on the container and in the beverage.

Aseptic filling of a BIC type container may require an expensive and complicated machine. It is preferred to provide a beverage container, in particular a beverage container for use in the beverage dispensing assembly as described in NL2017109, which may require less complex machinery to fill aseptically.

A first aspect provides a pressure vessel for use in a beverage dispensing assembly, the pressure vessel comprising a housing provided by at least two shell parts, the housing comprising a gas inlet for receiving a gas in the pressure vessel, and a beverage dispensing passage, wherein the at least two shell parts are releasably connectable for forming the housing and for receiving a compressible beverage container assembly filled with a beverage or at least a flexible bag filled with a beverage in the housing.

In particular embodiments, the at least two shell parts are releasably connectable for forming the housing and for receiving a compressible beverage container assembly filled with a substantially non-carbonated beverage in the housing. However, also, a compressible beverage container assembly filled with a carbonated beverage such as beer and cider may also be received in the housing.

The housing may comprise a neck portion and a shoulder portion adjacent the neck portion. The shoulder portion and the neck portion may be shaped in accordance with the beverage dispensing assembly as described in NL2017109, which is hereby incorporate herein by reference.

In embodiments, the gas inlet may be provided through the neck portion. Alternatively, the gas inlet may be provided through any of the at least two shell parts.

In further embodiments, the beverage dispensing passage is provided through the neck portion. Alternatively, the beverage dispensing passage may be provided through any of the at least two shell parts.

With the known BIC container, the inner container containing the beverage is already surrounded by the outer container when the beverage is supplied to the inner container. With the pressure vessel according to the first aspect, it is possible to fill a compressible beverage container prior to surrounding the beverage container with an outer container. Hence, a BIC-like container is obtained of which the inner container it not necessarily surrounded by the outer container when the beverage is supplied to the inner container. Hence, the first aspect provides an outer container which can be reused multiple times with multiple inner containers.

Aseptic filling of an inner container not surrounded by an outer container and a rigid outer container in particular, for example a plastic bag as a compressible beverage container, may be easier and/or may require less complex machinery than aseptic filling of an inner container of a BIC container, already surrounded by the outer container. The aseptic filling may for example be easier if the inner container is easier to sterilize than an assembly of an inner container within an outer container.

In particular, the at least two shell parts may be released from one another, forming an opening or reception opening into the housing such that a filled compressible container can be placed into the housing. After placing the filled compressible container into the housing, the at least two shell parts may be connected to form a substantially air-tight housing around the compressible container.

In examples, the filled compressible container occupies a volume greater than 80% of a volume inside the housing. Preferably, the filled compressible container occupies a volume greater than 90% of a volume inside the housing, and even more preferably, the filled compressible container occupies a volume greater than 95% of a volume inside the housing.

After the beverage in the compressible container has been dispensed, the at least two shell parts may be released from one another, and the emptied or at least partially emptied compressible container may be removed from the pressure vessel. Preferably, the pressure vessel can be reused by placing a new filled compressible container into the housing. The compressible beverage container assemblies may be disposable, for example together with the used dispensing line. As such, contact between the beverage and the pressure vessel and/or the dispenser is substantially avoided, which may be advantageous for hygienic reasons.

Although they are releasable, the at least two shell parts may remain connected in the released state, for example by one or more hinges.

In embodiments, a first of the at least two shell parts may form the neck portion and the shoulder portion. In such embodiments, the first of the at least two shell parts may in use form at least part of a housing body. A second of the at least two shell parts may then, in use, form at least part of a lid for closing of an opening, in particular a reception opening, of the housing body. The seam between the at least two connected shell parts, may, in use, be a substantially horizontally orientated seam.

When the first of the at least two shell parts forms the neck portion and the shoulder portion, the neck portion and the shoulder portion may be formed out of single seamless portion of material. This may be advantageous when it is desired to provide the shoulder of the pressure vessel in contact with and/or close to a receptacle of a beverage dispenser, for example for cooling the pressure vessel, especially when using contact cooling between the receptacle and the pressure vessel.

In other embodiments, a first part of the shoulder portion may be formed by a first of the two shell parts, and a second part of the shoulder portion may be formed by a second of the two shell parts. The seam between the two connected shell parts may thus, in use, be a substantially vertically orientated seam.

Alternatively or additionally, a first part of the neck portion may be formed by a first of the two shell parts, and a second part of the neck portion may be formed by a second of the two shell parts. The seam between the two connected shell parts may thus, in use, be a substantially vertically orientated seam, mostly parallel to the centre line of the pressure vessel.

The neck portion of the pressure vessel may in embodiments comprise the beverage dispensing passage. When the first part of the neck portion and the shoulder portion is formed by a first of the two shell parts, and the second part of the neck portion and the shoulder portion is formed by a second of the two shell parts, the seam between the two shell parts may intersect the beverage dispensing passage.

The beverage dispensing passage may be arranged for accommodating at least part of a female adapter part of a compressible beverage container. In further embodiments, the beverage dispensing passage may be arranged for accommodating any other part of the compressible beverage container, such as the filling gland.

In general, the beverage dispensing passage may be a through hole through the pressure vessel, arranged to accommodate a part of a compressible beverage container, for example one or more gland parts. The beverage dispensing passage may extend through one or more of at least two shell parts and the neck section.

A pressure vessel according to the first aspect may comprise a compressible beverage container, for example filled with a substantially non-carbonated beverage, in the housing. The volume of beverage contained in the compressible beverage container may for example correspond to at least 70% of an inner volume of the housing, or even at least 80%, at least 90% or even 95% or more. This may allow effective usage of the available volume.

As an option, the neck portion may be connected to a first of the shell parts, and the second shell part may be a lid part positioned opposite to the neck portion when the shell parts are connected. A lid part may in general be smaller than the other shell part. A neck portion may in general be a separated component from the shell parts, or may alternatively be comprised by one or more shell parts.

The second shell part may thus be a lid part, which has a smaller height in a direction away from the neck portion than the first shell part, in particular less a height at least 50% smaller, at least 75% smaller, or even at least 85% smaller. This may allow the first shell part to form the majority of the volume in which a flexible bag filled with beverage may be present. A second aspect provides a compressible beverage container assembly, in particular a compressible beverage container assembly for use with a pressure vessel according to the first aspect, comprising a flexible bag defining a beverage storage volume, and a filling gland, connected to the flexible bag providing a gland beverage passage to the beverage storage volume and a female adapter part, connectable to the filling gland, arranged to receive at least part of a male adapter part of a dispensing line wherein a sealing member is provided in the gland beverage passage.

A compressible beverage container assembly may be understood as an assembly of several components forming a compressible beverage container. The components may be assembled at least partially before, during and/or after filling and/or before, during, or after placing the compressible beverage container assembly into the pressure vessel.

The flexible bag being flexible in the context of this description implies that the shape of the flexible bag can be manipulated by a pressure difference between the beverage storage volume and the surroundings of the flexible bag. In examples, the flexible bag comprises one or more thin layers of sheet material, for example between 10 um and 250 um, which sheet material may be transparent or opaque. In other examples, the flexible bag is similar to the inner container of the known BIC container.

Preferably, for example for hygienic reasons, the compressible beverage container is a single-use disposable beverage container.

For fixating the female adapter part to the pressure vessel, the female adapter part may comprises a fork receptacle arranged for receiving part of a clamping fork. In particular embodiments, the fork receptacle may be a groove, a flange, one or more cams, or any combination thereof.

Because the beverage container is a compressible beverage container, the shape of the beverage container when at least partially filled may be affected by the fluid pressure from the beverage inside the beverage container. The fluid pressure may affect the shape of the beverage container such that it becomes harder to place the filled beverage container inside the pressure vessel.

To define and more in particular limit the shape and perimeter of the flexible bag, embodiments of the compressible beverage container may comprise a releasable bag constriction member which in an unreleased state restricts an outer circumference of the flexible bag, and in a released state substantially allows the flexible bag to be shaped by virtue of a fluid pressure of fluid inside the beverage storage volume.

In a particular embodiment, the compressible beverage container is at least partially folded over itself, and the fold is kept in place by virtue of the bag constriction member, which may for example be embodied as a piece of tape.

The releasable bag constriction member may comprise one or more weakened sections, and rupturing at least one of the one or more weakened sections releases the releasable bag constriction member into the released state. In use, for example, the compressible beverage container may be at least partially placed in the pressure vessel prior to releasing the releasable bag constriction member.

The flexible bag may comprise two sheets which are glued, welded, or otherwisely connected together to form the beverage storage volume. These two sheets may form two side walls of the flexible bag.

In embodiments, the female adapter part is provided on a side wall of the flexible bag, and the beverage container may further comprise a bag carrying member, which bag carrying member is connected to or near the female adapter part, and the bag carrying member comprises a first handle provided at a first distance from the female adapter part and a second handle provided at a second distance from the female adapter part, which first distance is substantially the same as the second distance.

By manipulating the two handles of the bag carrying member, the female adapter part may be aimed towards the dispensing line passage of the pressure vessel when placing the compressible beverage container in the pressure vessel.

To further shape the beverage container for more convenient placement into the pressure vessel, the flexible bag may comprise at least one non-straight corner delimiting the beverage storage volume. Preferably, the two corners nearest to the female adapter part are non-straight corners.

In particular embodiments, the flexible bag may be filled with a coffee based beverage, in particular cold brewed coffee.

A third aspect provides a kit of parts to form a compressible beverage container assembly, comprising a compressible beverage container according to the second aspect and a dispensing line comprising at a downstream end a dispensing outlet and at an upstream end a male adapter part arranged to connect to the female adapter part.

The valve of the compressible beverage container may be operable for example by destroying the valve for creating a beverage passage, by repositioning the valve, or opening the valve in any other way. For opening the valve, the male adapter part may comprise a penetrating member. When the male adapter part is coupled to the receptacle, the penetrating member may engage with the valve for opening the valve and allowing beverage to be dispensed from the compressible beverage container.

A fourth aspect provides a pressure vessel assembly of a pressure vessel according to the first aspect and a beverage container according to the second aspect, wherein at least the flexible bag of the beverage container is provided inside the pressure vessel. By pressurising the pressure vessel, beverage may be pressed out of the flexible bag of which the outer wall is exposed to the pressure inside the pressure vessel.

With the compressible beverage container placed inside the pressure vessel, the gas inlet of the pressure vessel may be arranged for allowing a gas to be provided in a space between the compressible container and an inner wall of the vessel. If the gas pressure between the compressible container and the inner wall of the vessel is sufficiently high, the beverage may be dispensed from the compressible beverage container. As such, a flow path for gas may be provided by the gas inlet between the compressible beverage container and an inner wall of the pressure vessel.

A harness may be provided, arranged to contain the flexible bag of the beverage container in a shape corresponding to the housing of the pressure vessel for more convenient placement of the beverage container into the pressure vessel. The harness may be a separate component which may be reused with multiple flexible beverage containers.

As a particular option, the compressible beverage container assembly may be connected to the neck portion of the pressure vessel. In particular, the female adapter part may be connected to the neck portion of the pressure vessel.

A fifth aspect relates to a beverage dispensing assembly, which for example may be used in a bar, restaurant, or any other location where convenient dispensing of a beverage, in particular non-carbonated beverage, is preferred.

The beverage dispensing assembly comprises a pressure vessel assembly according to the fourth aspect. The beverage dispensing assembly further comprises a dispenser housing, wherein the dispenser housing is provided with a receptacle for receiving at least part of the pressure vessel assembly, wherein the pressure vessel assembly is positioned in the dispenser with the neck and shoulder portion facing downward, such that the neck portion and at least part of the shoulder portion are received in the receptacle, and wherein part of the shoulder portion extends close to and/or is in contact with a wall of the receptacle. A beverage dispensing assembly which is arranged for use with BIC-container is disclosed in NL2017109, which is hereby incorporated by reference. The pressure vessel assembly may be a substitute for the BIC-container.

The dispenser housing may comprise a cooling device for cooling at least a part of the wall of the receptacle, preferably for contact cooling of a part of at least the shoulder portion of the pressure vessel.

As a further option, the beverage dispenser assembly may comprise a gas supply and at least one gas connector, movable relative to the neck portion of the pressure vessel assembly, preferably substantially radially relative to a longitudinal axis of the neck portion of the pressure vessel assembly.

In general, the dispensing line of the compressible beverage container assembly may comprise at a downstream end a valve for opening and closing the dispensing line, and the beverage dispenser assembly may comprise a tap for connecting to and/or cooperating with the valve of the dispensing line. As such, using the tap, a user may open and close the valve for dispensing a desired volume of beverage.

A sixth aspect provides a method for operating a beverage dispenser assembly, in particular a beverage dispenser assembly according to the fifth aspect, the method comprising the steps of releasing two shell parts of a pressure vessel to expose an opening of the pressure vessel, positioning a flexible bag filled with beverage, in particular substantially non-carbonated beverage, in the pressure vessel through the opening, connecting the two shell parts, pressurising the pressure vessel, and allowing a flow of beverage through a dispensing line connected to the flexible bag. After positioning the flexible bag in the pressure vessel, a dispensing line may be connected to the flexible bag, in particular to a gland of the flexible bag.

The flexible bag filled with beverage may in particular be pre-filled at a filling plant, which is remote from the location where the method for operating the beverage dispenser assembly is performed.

Different methods for placing a beverage container inside a pressure vessel, which may be used in conjunction with the method of the sixth aspect will be elaborated on in the detailed description of the figures.

The person skilled in the art will appreciate that the pressure vessel according to the first aspect, the compressible beverage container according to the second aspect, the kit of parts according to the third aspect the assembly according to the fourth aspect, the beverage dispensing assembly according to the fifth aspect, and the method according to the sixth aspect relate to the single inventive concept of being able to dispense a beverage from a beverage container which is more convenient to fill aseptically.

BRIEF DESCRIPTION OF THE FIGURES

In the Figures.

DETAILED DESCRIPTION OF THE FIGURES

Figure 1:
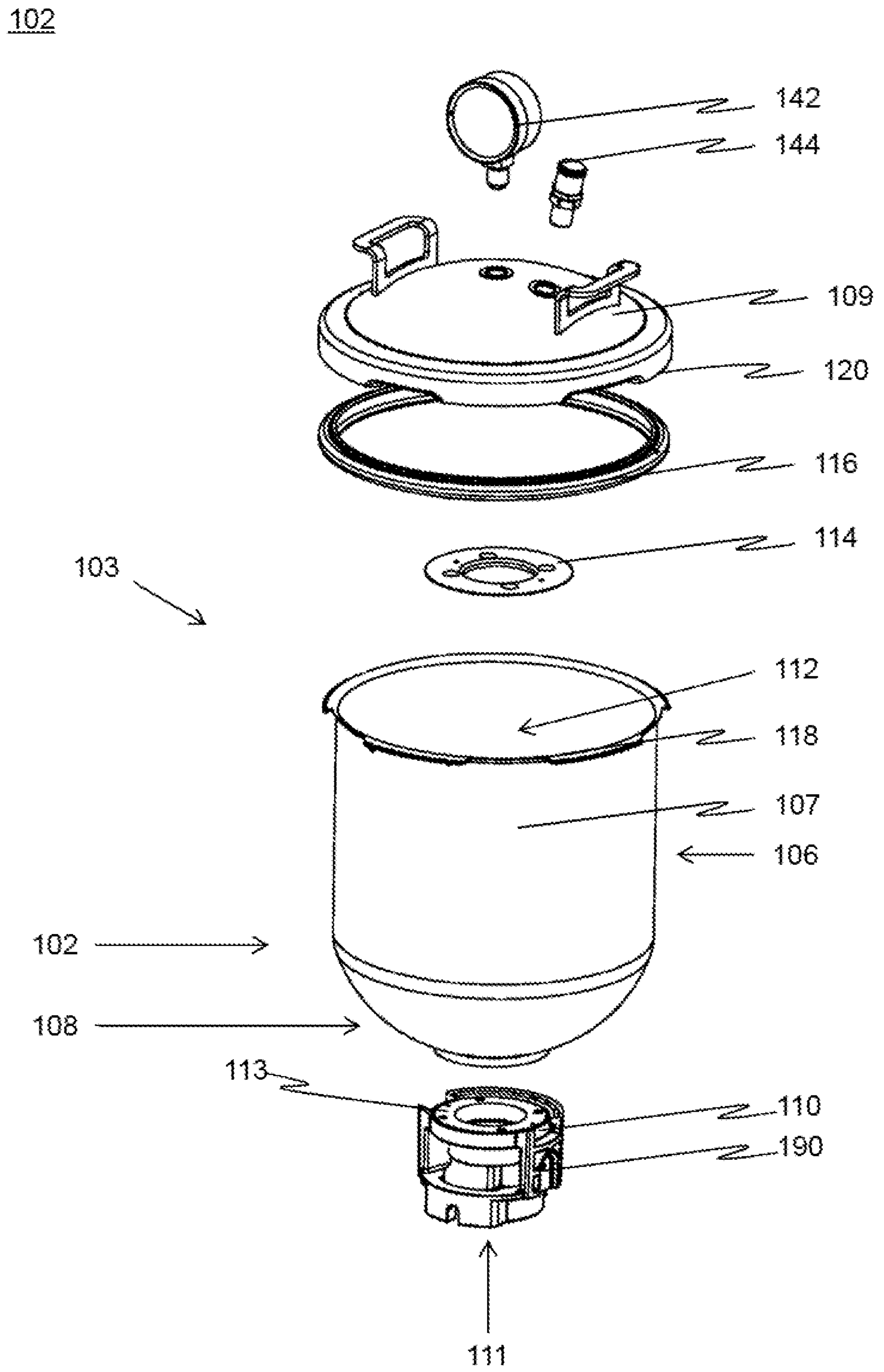
FIG. 1 shows an exploded view of an embodiment of a pressure vessel.

FIG. 1 shows an exploded view of an embodiment of a pressure vessel 102. The pressure vessel 102 as shown in FIG. 1 comprises a vessel housing 103 comprising a vessel body 106 as a first shell part, and a vessel lid 109 as a second shell part. The vessel body 106 comprises a shoulder portion 108. The vessel housing 103 further comprises a coupling element 110 as a neck portion, which coupling element 110 comprises a gas inlet 190 for receiving a gas flow into the pressure vessel 102. In assembled state, the coupling element 110 is adjacent to the shoulder portion 108.

In the embodiment of the pressure vessel 102 shown in FIG. 1, a beverage dispensing passage 111 is provided through the coupling element 110.

FIG. 1 shows that the vessel lid 109 may have a smaller height in a direction away from the neck portion than the vessel body 106. The vessel lid 109 may even be substantially flat shaped, i.e. it does not contribute more than 5%, or more than 10% to a volume delimited by the vessel lid 109 and vessel body 106 together when connected. In particular when a flexible bag filled with beverage is placed in the vessel body 106, only or approximately only the inner volume of the vessel body 106 may be used for holding the flexible bag with beverage. If the flexible bag would have a larger height than the vessel body 106, it may fold over a top rim of the vessel body 106, which may make placement of the flexible bag into the vessel body 106 more difficult.

In the particular embodiment as shown in FIG. 1, a coupling ring 114 is provided to connect the coupling element 110 to the vessel body 106. The coupling ring 114 is in assembled state provided inside the vessel body 106, and one or more connection elements such as screws or bolts may extend between the coupling ring 114 and the coupling element 110 to connect the coupling element 110 to the vessel body 106. By connecting the coupling element 110 to the vessel body 106 with the coupling ring 114, a gas tight seal may be achieved to prevent gas leaking between the vessel body 106 and a sealing surface 113 of the coupling element 110.

Next to the shoulder portion 108, the vessel body 106 as depicted in FIG. 1 comprises a cylindrical section 107. The vessel body 106 further comprises a reception opening 112 for receiving a compressible beverage container filled with a substantially non-carbonated beverage. The reception opening 112 is provided in the cylindrical section 107 of the vessel body 106.

In particular embodiments, the inner diameter of the vessel body 106 does not increase between the reception opening 112 and the shoulder section 108. In other words, the largest inner diameter of the vessel body 106 may be provided at the reception opening 112, which may ease the insertion of a flexible bag into this opening 112.

In embodiments, the shoulder portion 108 and the neck portion are comprised by a substantially monolithic vessel body 106. In other embodiments, the shoulder portion and the neck portion are comprised by multiple components that can be assembled together, for example using a screw connection or the coupling ring 114 as explained above.

The vessel body 106 and the vessel lid 109 can be releasably connected to form at least part of the pressure vessel housing 103. The connection is preferably gas tight, to prevent leakage of gas inside the housing 103 towards the ambient surroundings. To provide or improve gas tightness of the connection between the vessel body 106 and the vessel lid 109, a sealing ring 116 may be provided between the vessel body 106 and the vessel lid 109.

To connect the vessel body 106 and the vessel lid 109, the vessel body 106 comprises a set of one or more connection cams 118, and the vessel lid 109 comprises a clamping part 120 arranged to clamp onto the set of connection cams 118. In particular, to connect the vessel lid 109 onto the vessel body 106, the vessel lid 109 may be pressed onto the vessel body 106 with the clamping part 120 misaligned with the connection cams 118. Next, by rotating the vessel lid 109 relative to the vessel body 106, the clamping part 120 may align with the set of connection cams 118 to prevent any movement of the vessel lid 109 relative to the vessel body 106 except for this rotating movement. In the same or another embodiment, the lid 109 and the vessel body 106 may be connected by means of a hinge.

The person skilled in the art will appreciate that the embodiments wherein the vessel body 106 comprises a set of connection cams 118, and the vessel lid 109 comprises a clamping part 120 is a mere example of possible ways of connecting the vessel lid 109 to the vessel body 106. In other embodiments, the vessel body 106 may comprise the clamping part 120 and the vessel lid 109 the set of connection cams 118. Additionally or alternatively, any other form of connection may be used, comprising one or more threads, bolts, nuts, screws, clamps, any other connection element, or any combination thereof.

As an option, the pressure vessel 102 may comprise a pressure gauge 142. By virtue of the pressure gauge 142, a readout may be made from outside the pressure vessel 102 indicative of a pressure inside the pressure vessel 102. For example, the pressure gauge 142 may partially protrude through the vessel lid 109 or any other part of the vessel housing to come into contact with the pressure inside the pressure vessel 102.

As a further option, the pressure vessel 102 may comprise a safety release valve 144. Through the safety release valve 144, a pressure release gas path may be provided between the inside of the pressure vessel 102 and the ambient surrounding of the pressure vessel 102. The safety release valve 144 may be arranged to open this gas path when the pressure difference between the inside of the pressure vessel 102 and the ambient surrounding exceeds a pre-determined threshold.

Figure 2A:
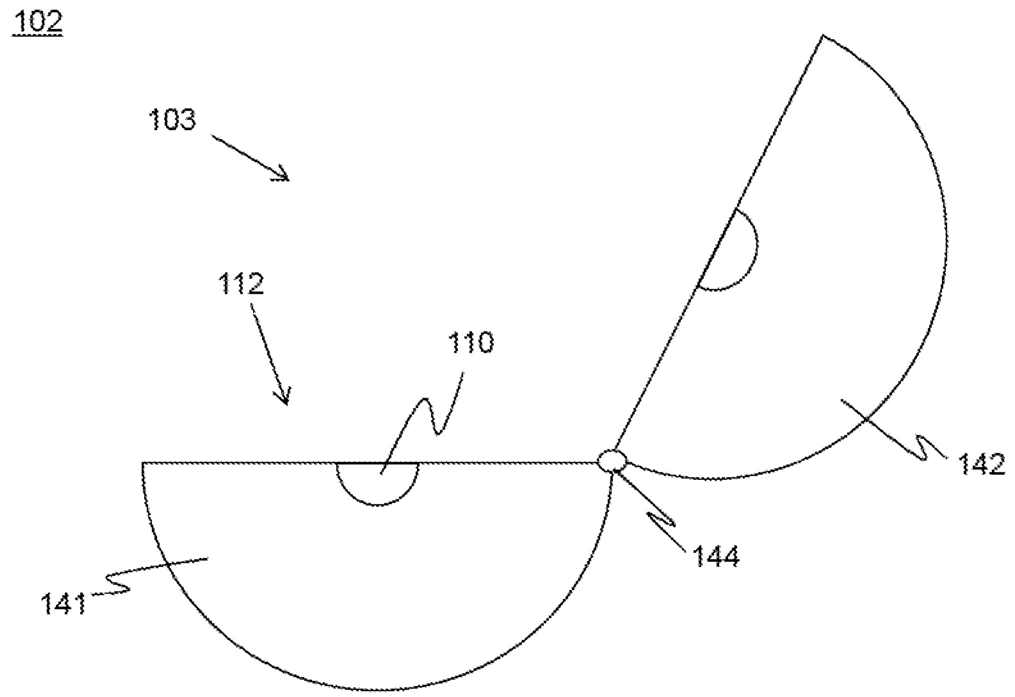
FIGS. 2A and 2B schematically depict a further embodiment of a pressure vessel, respectively in a side view and a top view.
Figure 2B:
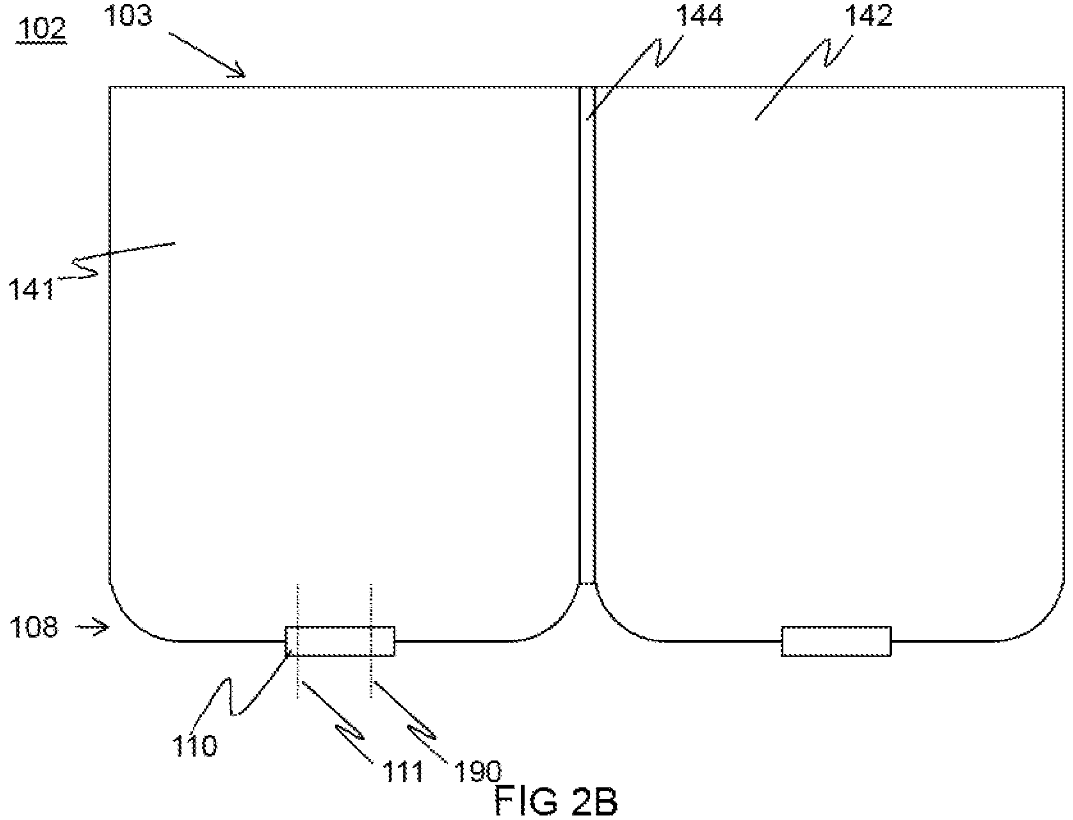

FIGS. 2A and 2B schematically depict a further embodiment of a pressure vessel 102, respectively in a side view and a top view. The pressure vessel 102 as depicted in FIGS. 2A and 2B comprises a first shell part 141 and a second shell part 142 which are releasably connected via a hinge 144. When connected, the first shell part 141 and the second shell part 142 form at least part of the housing 103 of the pressure vessel.

In FIGS. 2A and 2B, the two shell parts 141 and 142 are shown in an opened state in which a compressible beverage container filled with a substantially non-carbonated beverage can be received in at least one of the first shell part 141 and the second shell part 142. For example, the reception opening may be provided by the first shell part 141.

The beverage dispensing opening 111 and the gas inlet 190 may be substantially parallel extending through one of the two shell parts, or both of the shell parts 141 and 142, in particular through a neck section 110.

The person skilled in the art will appreciate that different aspects of different embodiments of the pressure vessel 102 may be readily combined. For example may aspects of the embodiment depicted in FIGS. 2A and 2B be combined with aspects of the embodiment of the pressure vessel 102 as shown in FIG. 1.

Figure 3A:
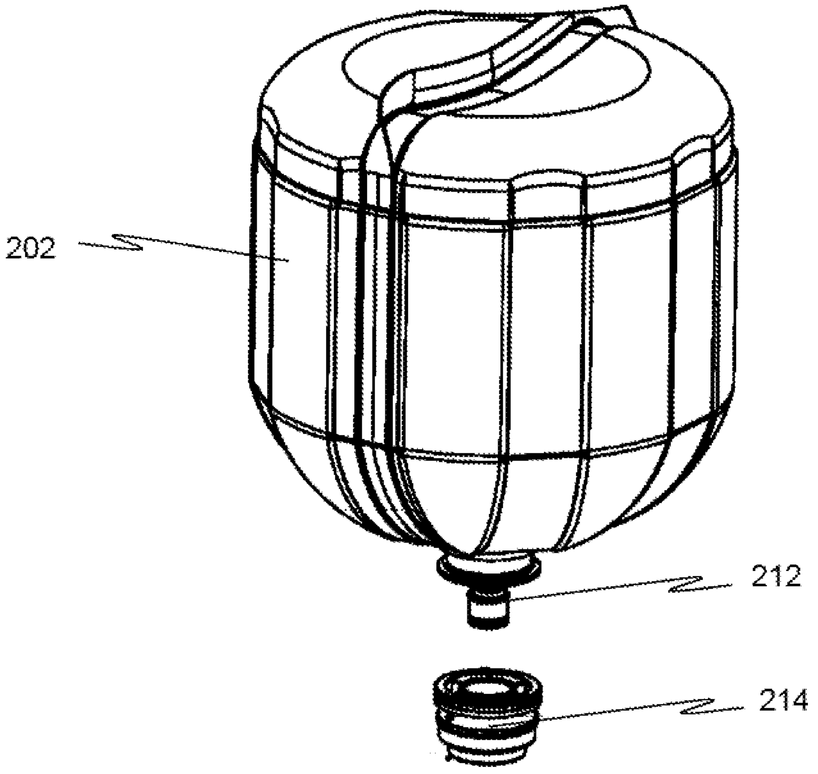
FIG. 3A shows an exploded view of an embodiment of a compressible beverage container.

FIG. 3A shows an exploded view of an embodiment of a compressible beverage container assembly 200, comprising a flexible bag 202 defining a beverage storage volume. Connected to the flexible bag 202 is a filling gland 212 which provides a beverage passage to the beverage storage volume. By virtue of the beverage passage, the beverage storage volume of the flexible bag 202 can be filled, and as an option, during dispensing of the beverage, the beverage storage volume of the flexible bag 202 can be emptied through the same beverage passage. Embodiments of beverage containers comprising separate beverage passages for filling and dispensing are also envisioned.

The beverage container 200 further comprises a female adapter part 214 arranged for coupling with a male adapter part. In assembled state, at least part of the male adapter part may be coaxially mounted in the female adapter part 214.

Figure 3B:
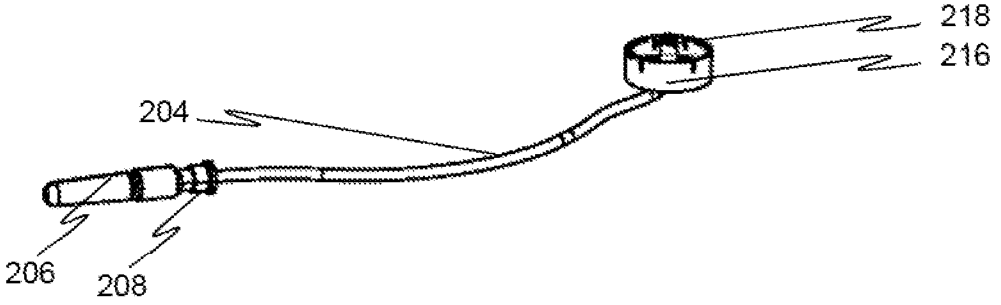
FIG. 3B shows an embodiment of a flexible dispensing line.

FIG. 3B shows an embodiment of a flexible dispensing line 204, comprising at a downstream end a dispensing outlet 206 and at an upstream end a male adapter part 216 arranged to be connected to the female adapter part 214 of the compressible beverage container assembly 200. The male adapter part 216 comprises a penetrating member 218 arranged to, when the male adapter part 216 is being coupled to the female adapter part 214, penetrate a sealing member comprised by the beverage container 200 to allow dispensing of beverage from the compressible beverage container assembly 200.

The sealing member may be provided in the same material of the compressible beverage container assembly 200. Alternatively, sealing member is provided in another material. The sealing member may be pierceable, or, alternatively or additionally, be provided as a valve that may be slidable, pivotable or otherwise be movable, optionally biased by a biasing member like a spring, preferably towards a positing in which the opening is closed.

Figure 4A:
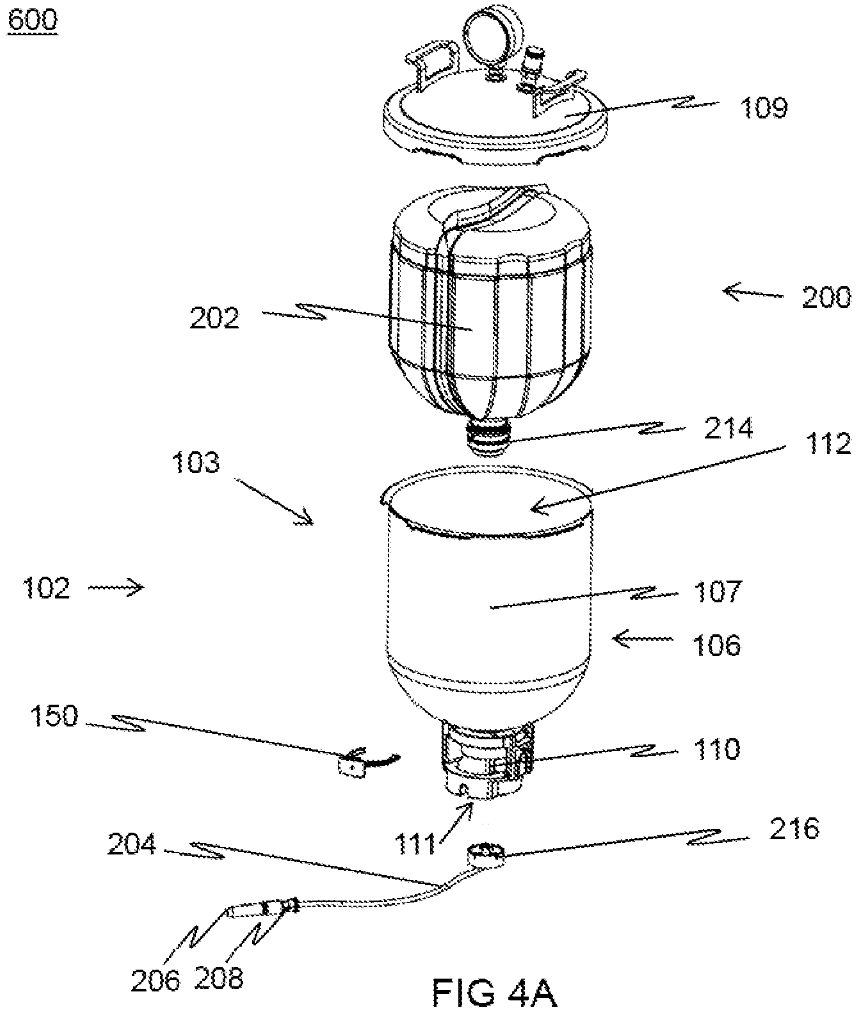
FIG. 4A shows an exploded view of an embodiment of a pressure vessel assembly.
Figure 4B:
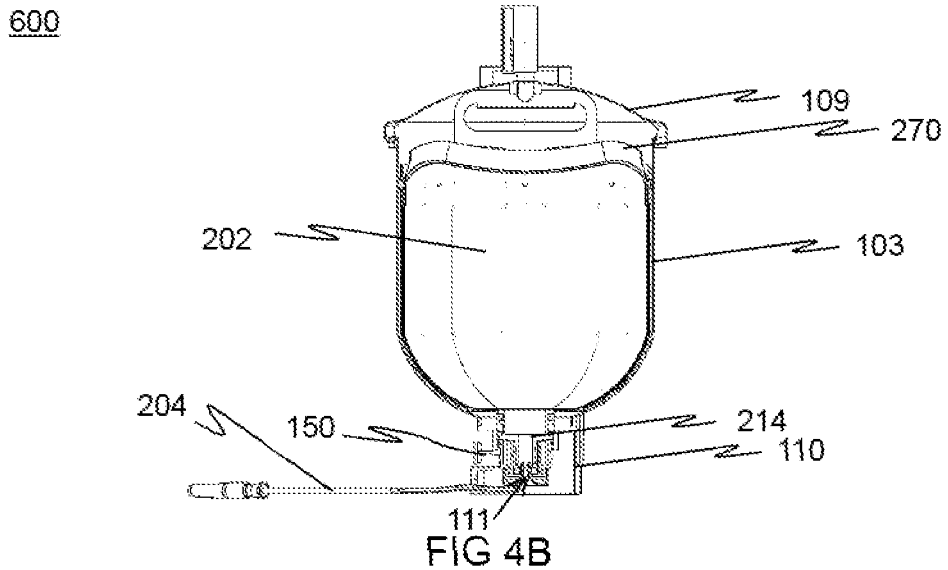
FIG. 4B shows a cross section of an embodiment of the pressure vessel assembly in assembled state.

FIG. 4A shows an exploded view of a pressure vessel assembly 600. FIG. 4B shows the pressure vessel assembly 600 in an assembled state, comprising an embodiment of a compressible beverage container assembly 200, an embodiment of a flexible dispensing line 204 and an embodiment of a pressure vessel 102.

For assembling the pressure vessel assembly 600, the following steps may be performed. If the vessel lid 109 is connected to the vessel body 106, a first step comprises disconnecting the vessel lid 109 from the vessel body 106 for exposing the reception opening 112. If a compressible beverage container is present in the pressure vessel 104, first, an optional clamping fork 150 may need to be removed from a fork receptacle 157 optionally comprised by the female adapter part 214.

Next, the beverage container 200 present in the pressure vessel 102, which may be an emptied or partially emptied container, can be removed from the pressure vessel 102. During this removal, the dispensing line 204 may be pulled through the beverage dispensing passage 111. The beverage container may be disposed of after being emptied.

To place a new, fully filled beverage container 200 in the pressure vessel 102, the beverage container 200 has to pass through the reception opening 112. Also, at least part of the female adapter part 214 may pass through at least part of the beverage dispensing passage 111.

In embodiments, the male adapter part 216 may be connected to the female adapter part 214 after the female adapter part 214 has passed through at least part of the beverage dispensing passage 111. In other embodiments, the male adapter part 216 is connected to the female gland par 214 before the compressible beverage container assembly 200 is placed in the pressure vessel 102. In the latter case, the entire dispensing line 204 may have to be passed through the beverage dispensing passage 111. After the female adapter part 214 is properly positioned, optionally, the clamping fork 150 may be connected to the fork receptacle 157 to fixate the position of the female adapter part 214 to the pressure vessel 102.

Finally, the lid 109 as a shell part may be connected to the body 106 as a shell part such that a gas tight seal is achieved between the lid 109 and the body 106. FIG. 4B shows a cross section of an embodiment of pressure vessel assembly 600 in an assembled state.

Figure 5A:
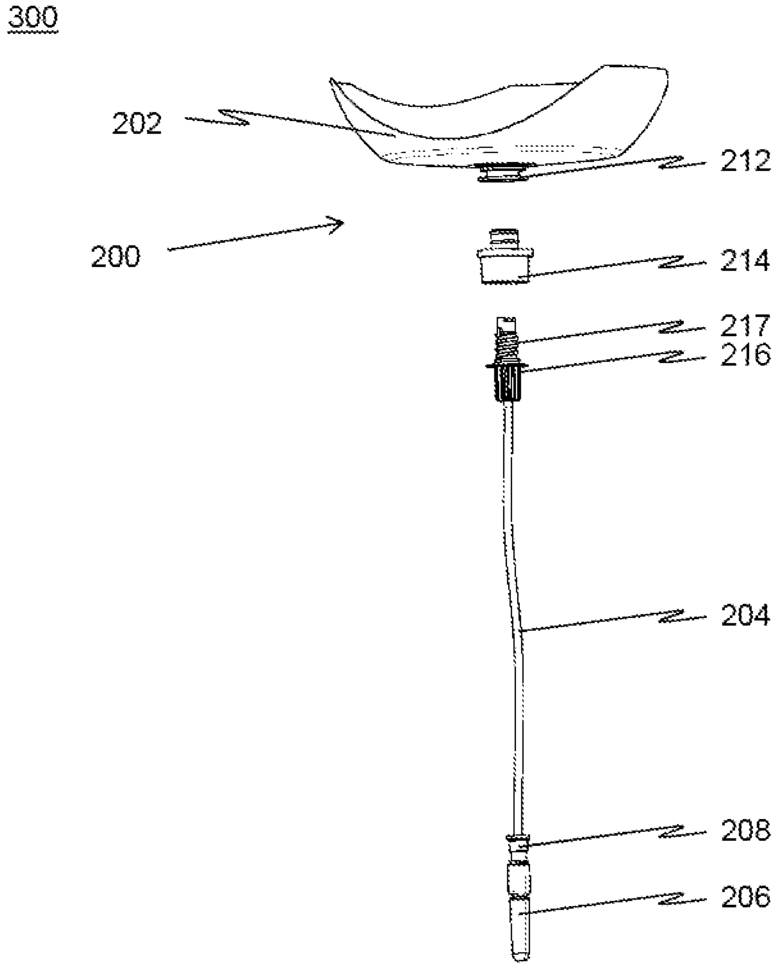
FIG. 5A shows an exploded view of another embodiment of a compressible beverage container assembly.

FIG. 5A shows an exploded view of another embodiment of a compressible beverage container assembly 300, with a beverage container 200 comprising a flexible bag 202 of which for conciseness of the figure only a part is shown. Connected to the flexible bag 202 is the filling gland 212. Connectable to the filling gland 212 or optionally directly to the flexible bag 202 is the female adapter part 214.

The dispensing line 204 comprises at the upstream end the male adapter part 216 or is upstream connected to the male adapter part 216, with an optional male threaded section 217 for connecting with an optional female threaded section comprised by the female adapter part 214. In the embodiment shown by FIG. 5A, the dispensing line 204 is provided parallel to a centre line of the male adapter part 216. In another embodiment, the dispensing line 204 is connected under an angle relative to the centre line of the male adapter part. In a preferred embodiment, the centre line of the male adapter part is provided substantially perpendicular to a centre line of the dispensing line 204.

Figure 5B:
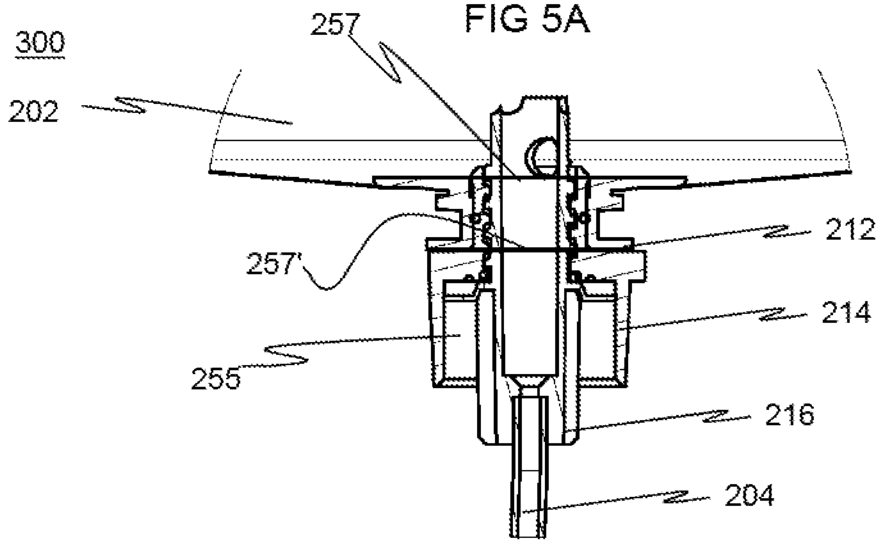
FIG. 5B shows part of a compressible beverage container assembly in assembled state.

FIG. 5B shows part of the embodiment of the compressible beverage container assembly 300 in assembled state. The male adapter part 216 is screwed into the female adapter part 214. While screwing the male adapter part 216 into the female adapter part 214, a sealing member 257 may be penetrated and opened such that beverage may be dispensed from the beverage container 200. Additionally or alternatively, a further sealing member 257' may be present in the female adapter part 214.

In the particular embodiment shown in FIG. 5B, a reception space 255 is provided between the female adapter part 214 and the male adapter part 216. This reception space 255 may be used to form a gas tight seal with the pressure vessel 102. In particular embodiments, a gas tight sealing member such as an O-ring may be provided in the reception space 255. The O-ring may be a separate part or may be comprised by the male adapter part 216, the female adapter part 214, or both.

Figure 6:
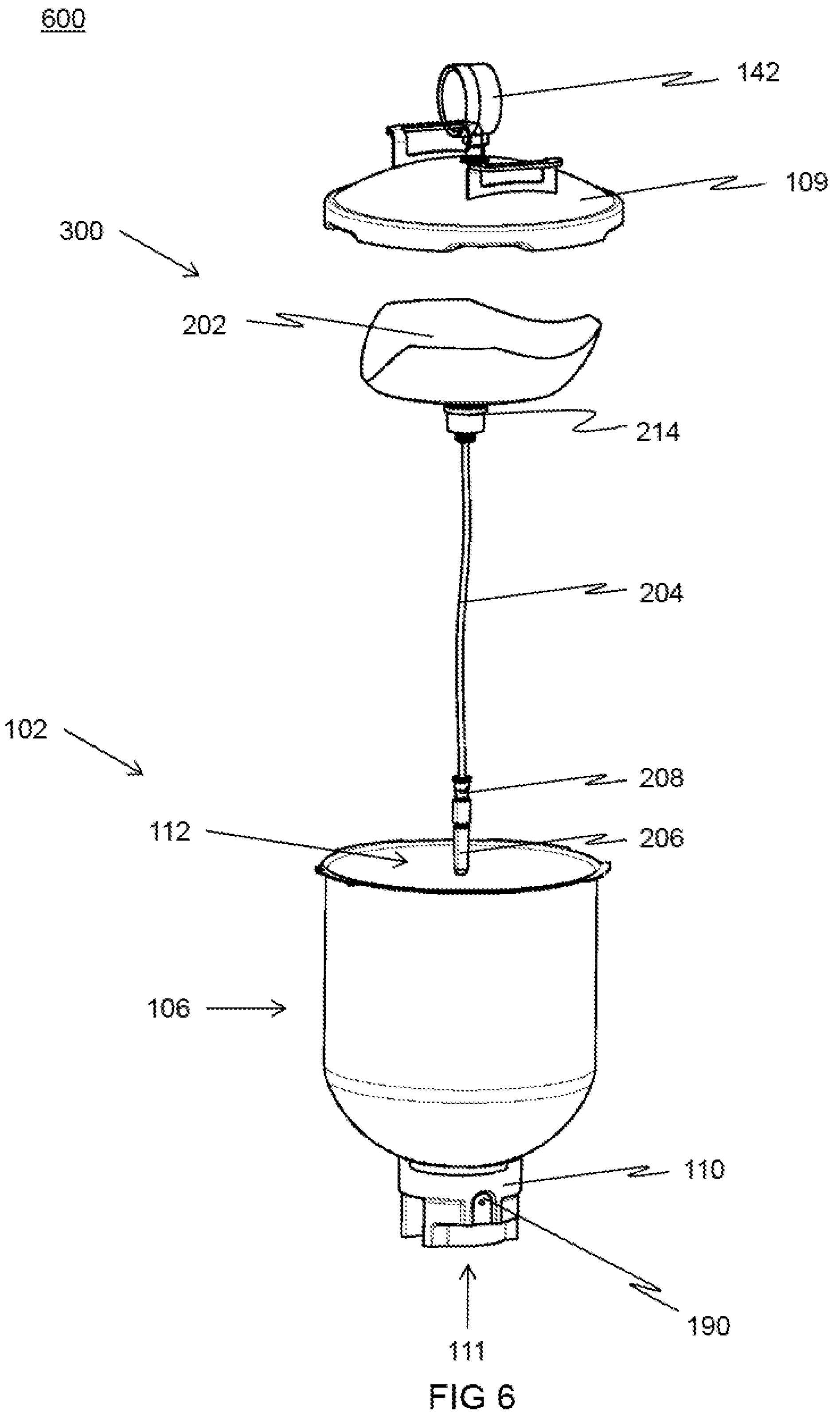
FIG. 6 shows another embodiment of a pressure vessel assembly.

FIG. 6 shows another embodiment of a pressure vessel assembly 600, comprising an embodiment of the pressure vessel 102 and an embodiment of a compressible beverage container assembly 300 of which only part of the flexible bag 202 is shown.

In the particular embodiment of FIG. 6, for assembling the assembly 600, the dispensing line 204 or at least part thereof is passed through the beverage dispensing passage 111 such that the female adapter part 214 is positioned in the beverage dispensing passage 111.

In particular, when part of the dispensing line 204 has passed through the beverage dispensing passage 111, this part of the dispensing line 204 may be used to position the female adapter part relative to the beverage dispensing passage 111. For the part of the dispensing line 204 to be passed through the beverage dispensing passage 111, it may not be required that a part or a considerable part of the flexible bag 202 is already present inside the pressure vessel 100.

As an example, the following method for placing a beverage container inside a pressure vessel is envisioned. The example of the method comprises providing a beverage container assembly with a female adapter part connected. A carrying member is connected to the flexible bag as for example described in conjunction with FIGS. 8A, 8B and 8C.

A dispensing line with male adapter part is next removed from its packaging, and the male adapter part is screwed into the female adapter part. To indicate to a user that the male adapter part is screwed sufficiently far into the female adapter part, the user may notice that at some point it becomes hard or harder or even impossible to screw the male adapter part further into the female adapter part.

Next, the flexible bag is lifted using the carrying member, and using one or more of the handles of the carrying member, the flexible bag is positioned relative to the pressure vessel such that the dispensing line, which may hang from the flexible bag, passes through the beverage dispensing passage.

In a further step, for example simultaneously, the flexible bag is lowered into the pressure vessel and part of the dispensing line protruding through the beverage dispensing passage is pulled. The beverage dispensing passage may be pulled on until the female adapter part is correctly placed in the beverage dispensing passage.

In an even further step, the pressure vessel may be placed in a beverage dispensing assembly, and an outlet end of the disposable dispensing line may be connected to a dispensing mechanism of the beverage dispensing assembly.

Kits of parts may thus also comprise a disposable dispensing line comprising the male adapter part sealed in a package, which package is preferably substantially sterile.

Figure 7A:
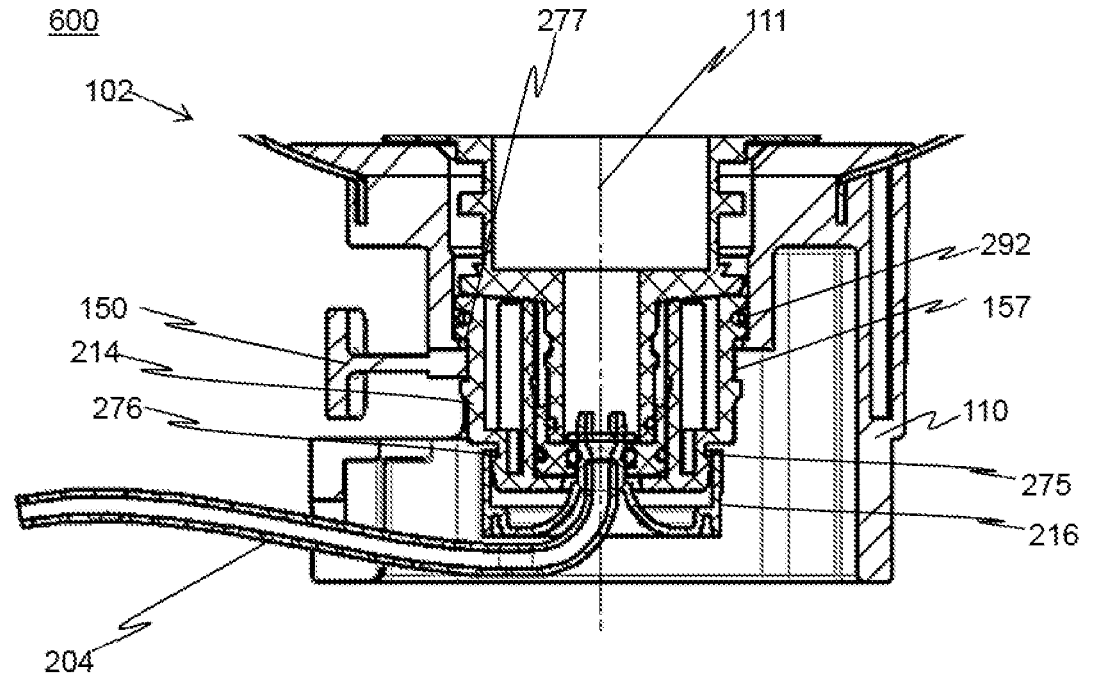
FIG. 7A shows a detailed view of part of a pressure vessel assembly.

FIG. 7A shows a detailed cross-sectional view of part of a pressure vessel assembly 600. The pressure vessel assembly 600 comprises an embodiment of the pressure vessel 102, which may be the embodiment depicted in FIG. 1, FIG. 4A and/or FIG. 4B or any other embodiment, and an embodiment of a beverage container assembly 300, which may be a beverage container assembly 300 as depicted in FIGS. 3A and 3B.

As shown in FIG. 7A, the female adapter part 214 is locked into place by virtue of the clamping fork 150 being connected to the fork receptacle 157. The fork receptacle 157 is here as an option embodied as a groove, preferably a circumferentially formed grove, formed between two flanges of the female adapter part 214.

The male adapter part 216 is clamped onto the female adapter part 214, by virtue of a gripping flange 275 of the male adapter part 216 gripping behind a gripping groove 276 of the female adapter part 214. To provide a gas tight seal between the female adapter part 214 and the pressure vessel 102, which may be required for gas tightly sealing off the pressure vessel 102 such that an inner volume of the pressure vessel 102 with the beverage container 200 in the inner volume can be pressurised for dispensing beverage from the beverage container 200, an O-ring 292 is provided. In the particular embodiment shown in FIG. 7A, the O-ring 292 is provided by the female adapter part 214 between two flanges protruding from the female adapter part 214.

To prevent the female adapter part 214 from being pushed or pulled through the beverage dispensing passage 111 schematically shown by the dash-dotted-line with reference numeral 111, the coupling element 110 may comprise a catching flange 277 which has provides a smaller diameter to catch the female adapter part 214 and prevent further movement of the female adapter part 214 in a first direction, which first direction is preferably outward of the pressure vessel.102

The clamping fork 150 may then be used as an option to prevent movement of the female adapter part 214 in a second direction substantially opposite to the first direction. If the clamping fork 150 cannot be connected to the fork receptacle 157, this may indicate that the female adapter part 214 does not contact the catching flange 277 yet, and the female adapter part 214 should be pushed or pulled further through the beverage dispensing passage 111.

Figure 7B:
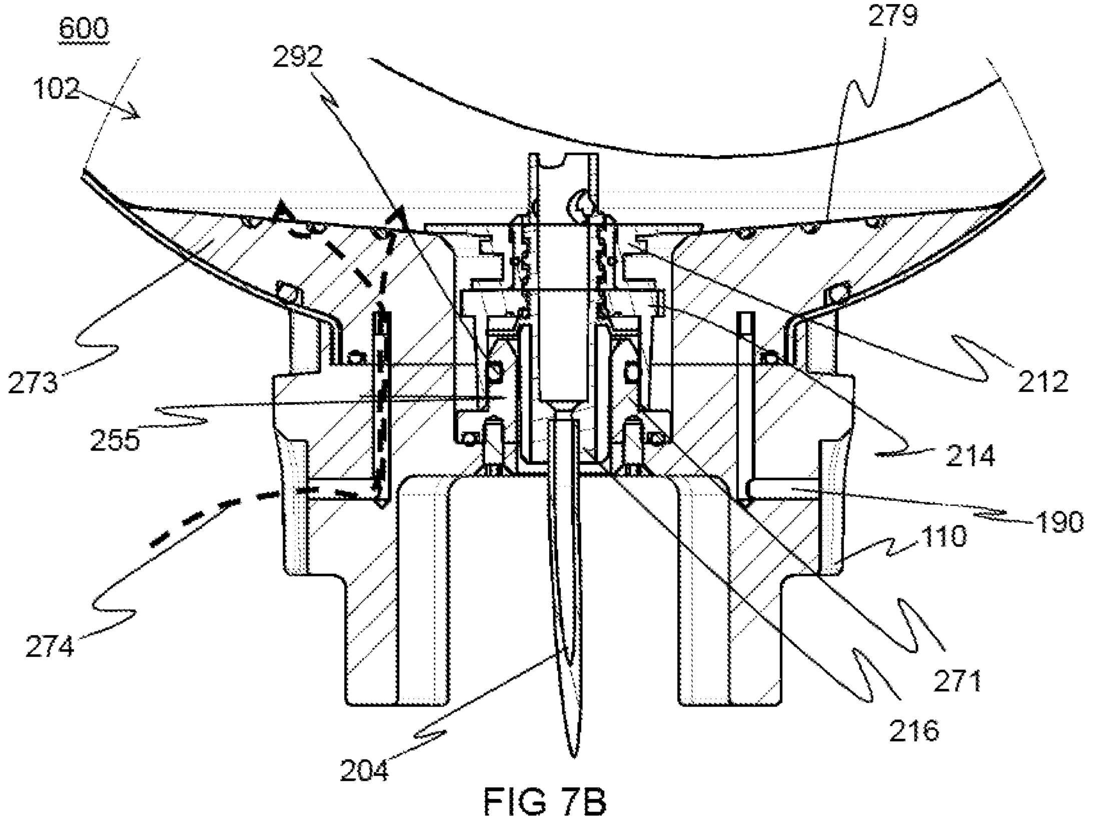
FIG. 7B shows a detailed cross-sectional view of part of another embodiment of a pressure vessel assembly.

FIG. 7B shows a detailed cross-sectional view of part of another embodiment of a pressure vessel assembly 600. The cross-sectional view of FIG. 7B is 90 degrees turned relative to the same view of FIG. 7A over the dash-dotted line 111 of FIG. 7A, in particular to show the gas inlet 190 which in the embodiment of FIG. 7A may point into the paper and/or out of the paper.

FIG. 7B also shows the gas passage 190, which provides a gas flow path 274, which is shown as a dashed line. The gas flow path 274 may extend between an external pressurised gas source, not shown in the figure, which may be provided by a beverage dispensing assembly with which the coupler 110 may be especially arranged to be used.

FIG. 7B also shows, as an option which may be incorporated in any embodiment of the pressure vessel 102, a set of inner protrusions 273 which defines a container reception surface 279. The reception surface 279 may be provided by a flat surface, by ribs provided radially relative to the dash-dotted line 111. Preferably, the reception surface 279 provides protrusions, recesses or both such that the flexible bag 202 is not entirely flush with the inner wall of the pressure vessel 102. In this way, air is enabled to flow to the top of the pressure vessel 102 to press on the flexible bag 202 to push beverage through the dispensing line 204.

By virtue of the inner protrusions 273 being spaced apart, the gas flow path 274 may end at many different locations inside the pressure vessel 102 and may provide an even pressure to the beverage container 200. A space between the inner protrusions 274 may thus form part of the space between the compressible beverage container assembly 200 and an inner wall of the pressure vessel 102.

The embodiment of the coupling element 110 as shown in FIG. 7B comprises a sealing protrusion 271, arranged to be at least partially received into the reception space 255 provided between the female adapter part 214 and the male adapter part 216, as shown for example in FIG. 5B.

Surrounding the sealing protrusion 271 is an O-ring 292 as an example of a sealing member for providing a gas-tight seal between the pressure vessel 102 and the female adapter part 214.

Figure 8A:
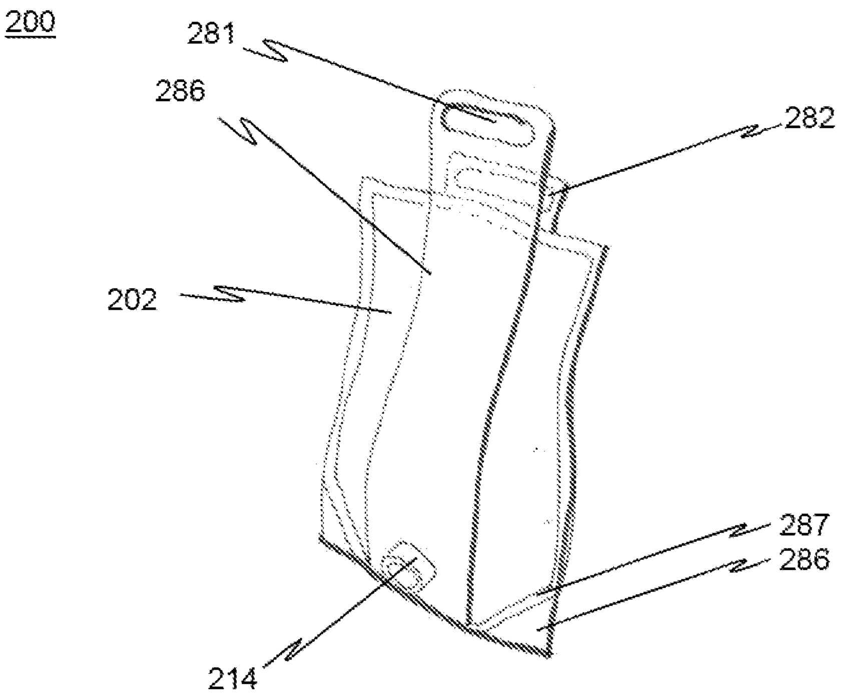
FIGS. 8A, 8B, and 8C schematically depict an embodiment of the compressible beverage container assembly.
Figure 8B:
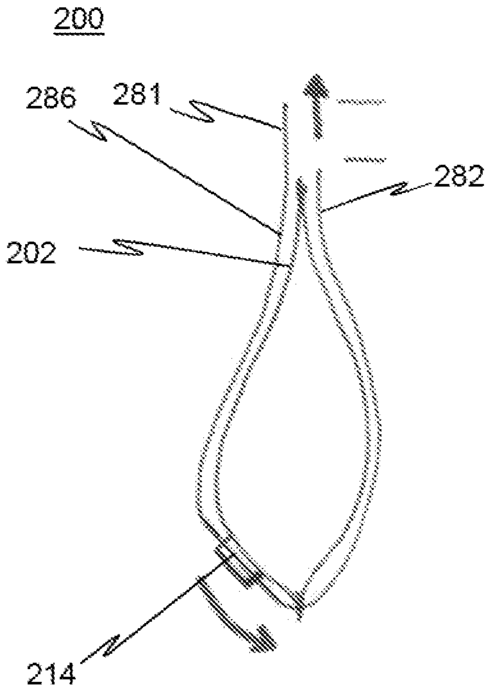
Figure 8C:
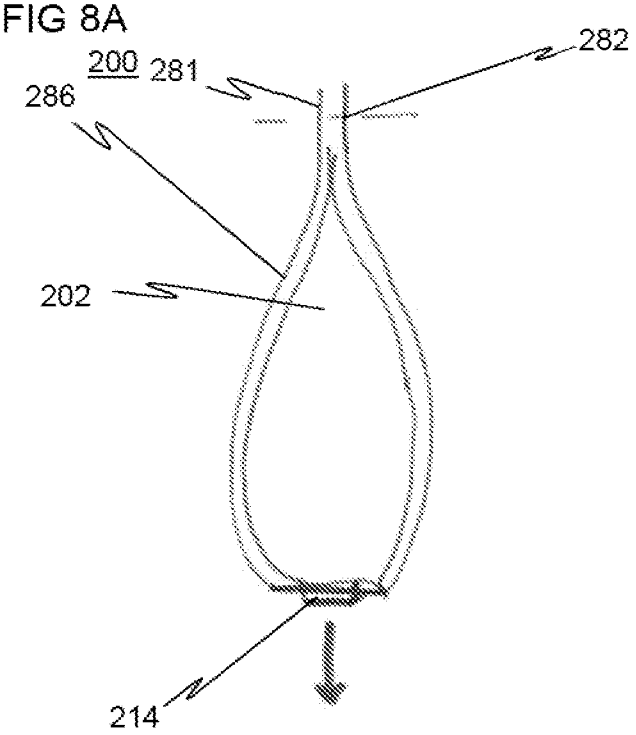

In FIGS. 8A, 8B, and 8C, schematically an embodiment of the compressible beverage container assembly 200 is depicted comprising the flexible bag 202. This particular embodiment comprises a female gland as an option which also may be applied with other embodiments of the beverage container assembly 200. In particular, the female adapter part 214 is provided a side wall of the flexible bag 202.

The assembly 200 further comprises a bag carrying member 286 connected to the female adapter part 214. The bag carrying member 286 comprises a first handle 281 and a second handle 282. The first handle 281 is provided at a first distance from the female adapter part 214 and the second handle 282 provided at a second distance from the female adapter part 214.

The bag carrying member 286 may be connected to the female adapter part 214 after filling of the flexible bag 202. A kit of parts is also envisioned comprising an embodiment of the beverage container assembly 200 and a separate bag carrying member 286. The separate bag carrying member 286 may be connected to the female adapter part 214 and/or any other part of the beverage container assembly 200 such as the flexible bag 202. The connection may be established with an adhesive, a snap-fit connection, by any other type of connection, or any combination thereof.

In the embodiment of FIGS. 8A, 8B, and 8C, the first distance is substantially the same as the second distance. Because the female adapter part 214 is provided at a distance from the bottom of the flexible bag, it may be required to re-orient the flexible bag 202, for example to align the female adapter part 214 with a dispensing passage of a pressure vessel.

For re-orienting the flexible bag 202, and in particular to re-orient the female adapter part 214, the first handle 281 and the second handle 282 can be aligned at the same height. This alignment is depicted in FIG. 8C, and in FIG. 8B, the unaligned state is shown. The arrows in FIG. 8B show the movement directions of the female adapter part 214 and the second handle 282, and the arrow in FIG. 8C shows the new orientation of the female adapter part 214.

As a further option which the flexible bag 202 may comprise independently from the carrying member by a beverage container assembly 200 is at least one non-straight corner 286 delimiting the beverage storage volume of embodiments of the flexible bag 202. By virtue of the at least one non-straight corner 286, the shape of the flexible bag 202 is adapted to fit more easy through the reception opening 212 of a pressure vessel.

The non-straight corner 286 may be formed by a seam 287 which seams two side walls of the flexible bag 202 together. In examples, the flexible bag 202 comprises two non-straight corners 286, which may be the corners nearest to the female adapter part 214. As can be seen from the drawings, non-straight may be understood as being provided under an angle relative to the other seams of the flexible bag 202, more than ninety degrees. In a preferred embodiment, the angle is about 135°, plus or minus 5° or less, though any angle between 160° and 100° or between 150° and 110° may be selected.

Figure 9A:
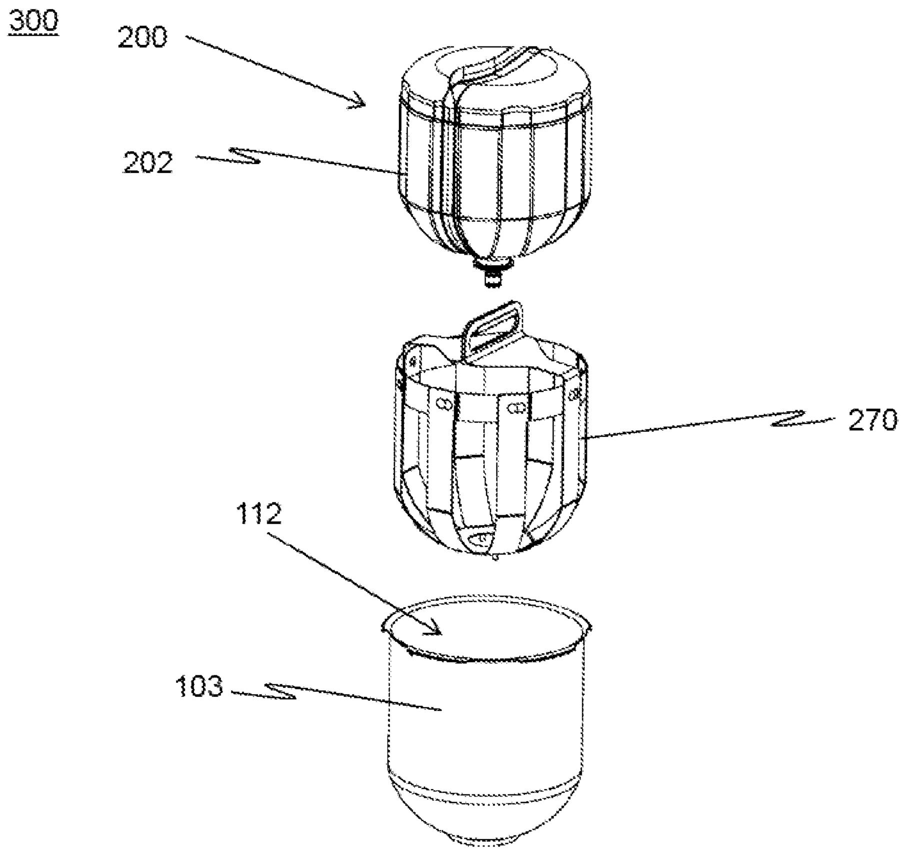
FIG. 9A shows part of a particular embodiment of a beverage container assembly.

FIG. 9A shows part of a particular embodiment of a beverage container assembly 300 for use in a beverage dispensing assembly. Of the assembly 300, for conciseness and clarity of the figure, only the compressible beverage container assembly 200 and the pressure vessel housing 103 are shown, together with an optional harness 270.

To assemble the assembly depicted in FIG. 9A, the flexible bag 202 is first placed in the harness 270. Next, the harness 270 with the flexible bag 202 in it is lowered through the reception opening 112 into the vessel housing 103. By virtue of the harness 270, the outer shape of the flexible bag 202 is contained in a shape corresponding to the housing 103 of the pressure vessel 100, and in particular to the reception opening 112.

Without the harness 270, part of the flexible bag 202 may bulge over the housing 103 while another part of the flexible bag 202 is placed in the housing 103 through the reception opening 112. The harness 270 may thus have a pre-determined outer shape, or at least a pre-determined outer diameter corresponding to a diameter of the reception opening 112.

The harness 270 may be used as an option in combination with any embodiment of the pressure vessel 100 and compressible beverage container assembly 200. In particular, the harness 270 is also shown in the assembly 30 of FIG. 4B.

A kit of parts is also envisioned comprising an embodiment of a beverage container assembly and a transport case, wherein the beverage container assembly can be placed in the transport case. By virtue of the transport case, the beverage container assembly may be protected during transport. The transport case may for example be a cardboard box.

In embodiments, the transport case may be shaped complementary to at least part of a pressure vessel. As such, the transport case with the beverage container assembly inside may be placed inside the pressure vessel, making it as an option possible for the beverage container assembly to remain inside the transport case. As an option, the transport case comprises a passage for any of the female adapter part, male adapter part, dispensing line, filling gland, or any combination thereof. The passage may be surrounded by a weakened section, such that the passage may be closed during transport, and opened just before the transport case and the beverage container assembly inside it is placed inside a pressure vessel for dispensing beverage.

Figure 9B:
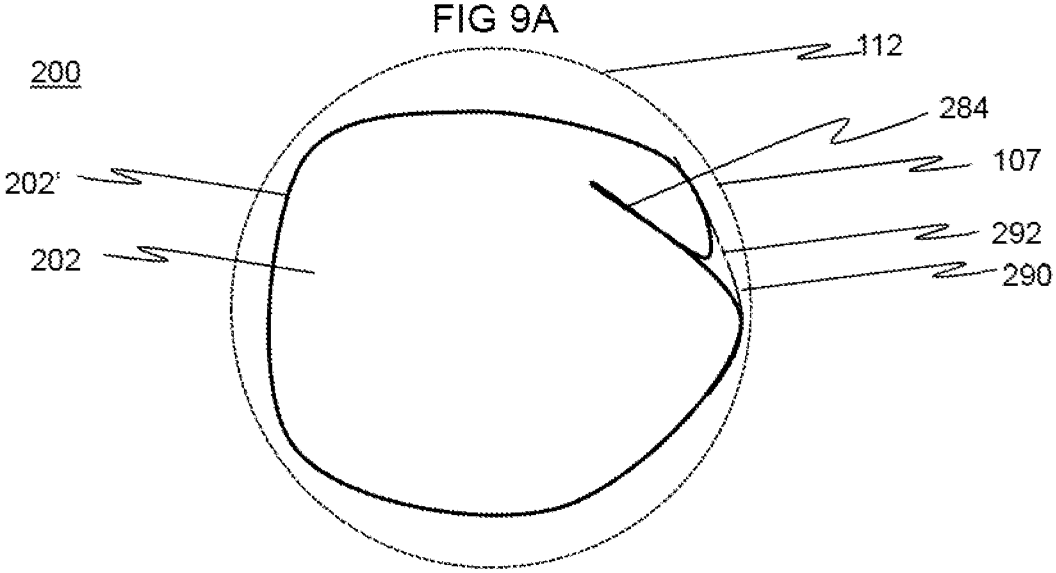
FIG. 9B schematically shows another embodiment of a compressible beverage container.

FIG. 9B schematically shows another embodiment of a compressible beverage container assembly 200, comprising the flexible bag 202. As an option of which the person skilled in the art will appreciate that may be combined with any other embodiment of the compressible beverage container assembly 200, the beverage container shown in FIG. 9B comprises a releasable bag constriction member 290.

The bag constriction member 290 is shown in an unreleased state, wherein the bag constriction member 209 restricts an outer circumference 202' of the flexible bag 202. In a released state, the bag constriction member 290 substantially allows the flexible bag 202 to be shaped by virtue of a fluid pressure of fluid inside the beverage storage volume.

By virtue of the bag constriction member 290, the flexible bag 202 comprises a folded section 284, wherein part of the flexible bag 202 is folded over itself. By virtue of the folded section 284, the outer circumference 202' is smaller in unreleased state than the outer circumference 202' would be in released state. The reception opening 112 of a pressure vessel 100 is shown as a dotted circle in FIG. 9B. As is visible from FIG. 9B, in the unreleased state, the outer circumference 202' of the flexible bag 202 fits inside the reception opening 202. In released state, the outer circumference 202' of the flexible bag 202 may not have fitted inside the reception opening 202.

For releasing the releasable bag constriction member 290, for example after a sufficiently large part of the flexible bag 202 is provided inside the pressure vessel housing 103, an optional weakened section 292 of the bag constriction member 290 may be ruptured.

In a particular embodiment, the releasable bag constriction member 290 is embodied as a piece of adhesive tape. The tape may either be removed from an outer wall of the flexible bag 202, or the tape may be rupture to release the bag constriction member 290.

Figure 10:
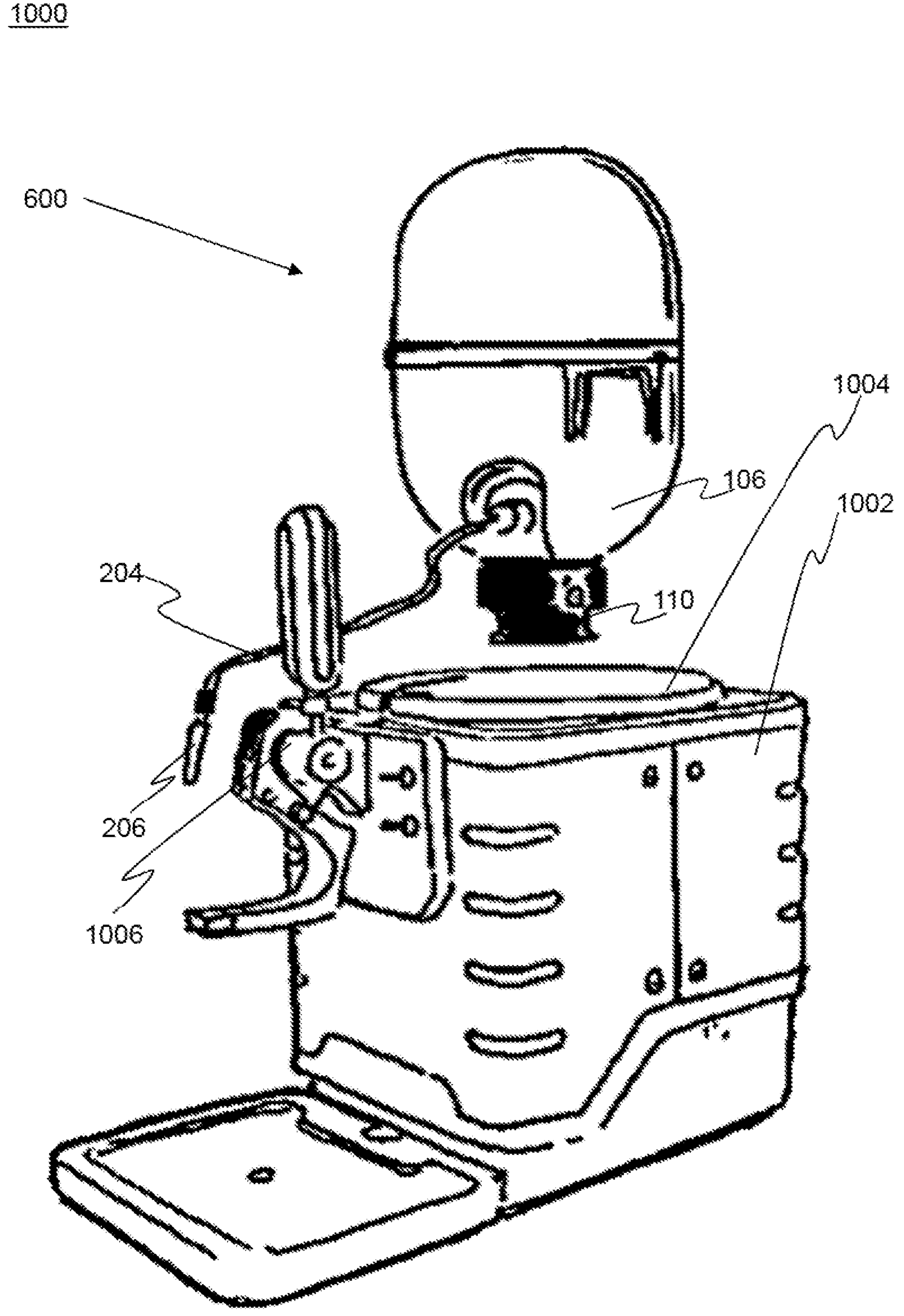
FIG. 10 shows a beverage dispenser assembly.

FIG. 10 depicts an example of beverage dispenser assembly 1000 with an example of a pressure vessel assembly 600 in an exploded view. The beverage dispenser assembly comprises a dispenser housing 1002 provided with a receptacle 1004 for receiving at least part of the pressure vessel assembly 600.

As can be seen in FIG. 10, the pressure vessel assembly 600 may be positioned in the dispenser housing 1002 with the neck portion 110 and the shoulder portion 108 facing downward, such that the neck portion and at least part of the shoulder portion are received in the receptacle, and wherein part of the shoulder portion extends close to and/or is in contact with a wall of the receptacle.

The beverage dispenser housing 1002 may resemble the beverage dispenser housing of NL2017109, which however does not disclose the pressure vessel assembly 600.

The beverage dispenser housing 1002 may comprise a tap 1006 for connecting to and/or cooperating with the valve at the dispensing outlet 206 of the dispensing line 204.

The invention claimed is:

1. Pressure vessel for use in a beverage dispensing assembly, the pressure vessel comprising:

a housing provided by at least two shell parts, the housing comprising:

a gas inlet for receiving a gas in the pressure vessel; and a beverage dispensing passage;

wherein the at least two shell parts are releasably connectable for forming the housing and for receiving a compressible beverage container assembly filled with a substantially non-carbonated beverage in the housing, the housing comprising a neck portion and a shoulder portion adjacent the neck portion and wherein the neck portion is connected to a first of the shell parts, a second of the shell parts is positioned opposite to the neck portion when the shell parts are connected, and wherein the gas inlet is provided through the neck portion, wherein the second shell part is a lid part, which has a smaller height in a direction away from the neck portion than the first shell part.

2. Pressure vessel according to claim 1, wherein the beverage dispensing passage is provided through the neck portion.

3. Pressure vessel according to claim 1, wherein a first of the at least two shell parts forms the entire shoulder portion.

4. Pressure vessel according to claim 1, wherein the beverage dispensing passage is arranged for accommodating at least part of a female adapter part of a compressible beverage container.

5. Pressure vessel according to claim 1, comprising the compressible beverage container assembly filled with a non-carbonated beverage in the housing.

6. Pressure vessel according to claim 1, wherein the lid part does not contribute more than 10% to a volume delimited by the two shell parts when connected.

7. Compressible beverage container assembly, comprising:

a flexible bag defining a beverage storage volume;

a filling gland, connected to the flexible bag providing a gland beverage passage to the beverage storage volume; and a female adapter part, connectable to the filling gland, arranged to receive at least part of a male adapter part of a dispensing line, wherein a sealing member is provided in the gland beverage passage, wherein the flexible bag comprises one or more thin layers of sheet material forming two side walls of the flexible bag, and wherein the filling gland is provided on one of the side walls of the flexible bag.

8. Beverage container assembly according to claim 7, further comprising a further sealing member surrounding the female adapter part.

9. Beverage container assembly according to claim 7, wherein the flexible bag comprises at least one non-straight corner delimiting the beverage storage volume.

10. Beverage container assembly according to claim 7, wherein the flexible bag is filled with a non-carbonated beverage.

11. Kit of parts to form a compressible beverage container assembly, comprising:

a compressible beverage container assembly according to claim 7; and a dispensing line comprising at a downstream end a dispensing outlet and at an upstream end a male adapter part arranged to be connected to the female adapter part.

12. Kit of parts according to claim 11, wherein the beverage container assembly further comprises a sealing member provided in the gland beverage passage, and wherein the male adapter part comprises a penetrating member for opening the sealing member.

13. Pressure vessel assembly for use in a beverage dispensing assembly, comprising:

a pressure vessel comprising:

a housing provided by at least two shell parts, the housing comprising:

a gas inlet for receiving a gas in the pressure vessel; and a beverage dispensing passage, wherein the at least two shell parts are releasably connectable for forming the housing and for receiving a compressible beverage container assembly filled with a substantially non-carbonated beverage in the housing, the housing comprising a neck portion and a shoulder portion adjacent the neck portion and wherein the neck portion is connected to a first of the shell parts, a second of the shell parts is positioned opposite to the neck portion when the shell parts are connected, and wherein the gas inlet is provided through the neck portion; and a compressible beverage container assembly comprising:

a flexible bag defining a beverage storage volume;

a filling gland, connected to the flexible bag providing a gland beverage passage to the beverage storage volume; and a female adapter part, connectable to the filling gland, arranged to receive at least part of a male adapter part of a dispensing line, wherein a sealing member is provided in the gland beverage passage, and wherein at least the flexible bag is provided inside the pressure vessel.

14. Pressure vessel assembly according to claim 13, wherein the gas inlet of the pressure vessel is arranged to provide a flow path for gas into a space between the flexible bag and an inner wall of the pressure vessel.

15. Pressure vessel assembly according to claim 13, wherein the compressible beverage container assembly is connected to the neck portion of the pressure vessel.

16. Beverage dispensing assembly, comprising:

a pressure vessel assembly according to any of the claim 13;

a dispenser housing, wherein the dispenser housing is provided with a receptacle for receiving at least part of the pressure vessel assembly, wherein the pressure vessel assembly is positioned in the dispenser with the neck and shoulder portion facing downward, such that the neck portion and at least part of the shoulder portion are received in the receptacle, and wherein part of the shoulder portion is in contact with a wall of the receptacle.

17. Beverage dispenser assembly according to claim 13, wherein the dispensing line of the compressible beverage container assembly comprises at a downstream end a valve for opening and closing the dispensing line, and the beverage dispenser assembly comprises a tap for cooperating with the valve of the dispensing line.

18. Method for operating a beverage dispenser assembly, the method comprising the steps of:

releasing two shell parts of a pressure vessel to expose an opening of the pressure vessel;

positioning a flexible bag filled with non-carbonated beverage in the pressure vessel through the opening;

connecting the two shell parts;

pressurising the pressure vessel; and allowing a flow of beverage through a dispensing line connected to the flexible bag.

19. Method according to claim 18, further comprising passing the dispensing line connected to the flexible bag through a beverage dispensing passage of the pressure vessel.

* * * * *